United States Patent [19]
Lühmann et al.

[11] Patent Number: 5,897,949
[45] Date of Patent: Apr. 27, 1999

[54] ADHESIVE TAPE

[75] Inventors: Bernd Lühmann, Norderstedt; Andreas Junghans, Hamburg, both of Germany

[73] Assignee: Beiersdorf AG, Hamburg, Germany

[21] Appl. No.: 08/977,254

[22] Filed: Nov. 24, 1997

[30] Foreign Application Priority Data

Nov. 30, 1996 [DE] Germany .................. 196 49 727

[51] Int. Cl.⁶ .................................................. B32B 7/12
[52] U.S. Cl. ...................... 428/317.3; 428/317.7; 428/343; 428/355 BL; 428/355 RA
[58] Field of Search ..................... 428/343, 317.3, 428/317.7, 355 BL, 355 RA

[56] References Cited

U.S. PATENT DOCUMENTS

| | | | |
|---|---|---|---|
| 4,024,312 | 5/1977 | Korpman ................. | 428/343 |
| 5,516,581 | 5/1996 | Kreckel et al. ............ | 428/317.3 |
| 5,643,668 | 7/1997 | Calhoun et al. .......... | 428/317.3 X |
| 5,759,679 | 6/1998 | Kitamura et al. ......... | 428/317.3 |

FOREIGN PATENT DOCUMENTS

| | | | |
|---|---|---|---|
| 61-3023984 | 7/1986 | Japan ...................... | 428/317.3 |
| WO92/1133 | 7/1992 | WIPO . | |
| WO92/11332 | 7/1992 | WIPO . | |
| WO93/01979 | 2/1993 | WIPO . | |
| WO94/21157 | 9/1994 | WIPO . | |
| WO95/06691 | 3/1995 | WIPO . | |

*Primary Examiner*—Daniel Zirker
*Attorney, Agent, or Firm*—Sprung Kramer Schaefer & Briscoe

[57] ABSTRACT

Adhesive tape for a bond which can be redetached by pulling, without residue and without damage, having a foam backing coated on one or both sides with a self-adhesive composition, characterized in that a) on at least one of the two sides of the foam backing there is applied a self-adhesive composition whose ratio of tear strength to stripping force (peel force) at a peel angle of less than 10° to the bond surface is greater than 1.2:1, b) the foam backing is subjected to controlled pretreatment/damaging in such a way that the detachment force (stripping force) is lowered relative to an analogous self-adhesive tape with a foam backing which has not been correspondingly pretreated/damaged, and c) the foam backing does not have a tear strength which is sufficient for redetachment without residue or damage.

17 Claims, No Drawings

ADHESIVE TAPE

The invention relates to an adhesive tape for a bond which can be redetached by pulling, without residue or damage, and to its use.

Highly extensible elastic adhesive films for redetachable bonds, which are redetachable by pulling essentially in the direction of the bond plane, are known and are obtainable commercially under the designation "tesa Power-Strips". Bonds produced therewith offer a powerful hold and yet can be released again without trace and without damage to the substrate or to the adherents, as is described in DE 33 31 016 C2. DE 4.222.849, DE 4.233.872, DE 4.428.587, DE 4.431.914 and DE 195 11 288 describe, inter alia, specific embodiments and applications of prior adhesive films.

Multilayer adhesive films which comprise highly extensible film backings of low elasticity, or highly extensible, elastic film backings, and uses of the same adhesive films, are likewise known, for instance from U.S. Pat. No. 4,024, 312 "Pressure-sensitive adhesive tape for medical use—having an extensible, elastic block copolymer backing", WO 92/11332 "Removable adhesive tape" (PSA tape using highly extensible backing with photopolymerized acrylic PSA), WO 92/11333 (PSA tape using highly extensible essentially inelastic backing), WO 93/01979 "Securing stacks with stretch adhesive tape", and WO 94/21157 "Article support using stretch releasing adhesive".

WO 92/11333, for instance, describes an adhesive tape which can be released again by pulling in the bond plane and which uses as its backing a highly stretchable, essentially nonresilient (nonelastomeric) film having a resilience after stretching of <about 50%. U.S. Pat. No. 4,024,312 describes, correspondingly, deadhering self-adhesive tapes which are essentially elastomeric in nature.

In practice it is found that it is possible in general to achieve high bond strengths with the above-mentioned self-adhesive tapes on smooth and firm substrates. On rough substrates the bond strength, especially for thin products but also for self-adhesive tapes of relatively high layer thickness, is inadequate for many applications. The apparent reason for the inadequate bond strength is primarily an insufficient bond area, caused by insufficient conformability of the adhesive tapes to rough and irregular surfaces, especially when two rough substrates are to be bonded to one another. For example, when planar materials are bonded by means of tesa Power-Strips to coated woodchip wallpaper at the pressures customarily employed for press-on application (100 N/7.4 $cm^2$), bond areas of only about 10%v to 40% of the adhesive area are often achieved. However, even when bonding onto smooth planar surfaces, an inadequate bond area may be the reason for deficient bond strength. The cause is probably the inclusion of air bubbles in the bond areas. Such air bubbles can often not be removed completely even by means of high application pressures. In adverse cases, bonds having such air inclusions may be the cause of drastically reduced bond strengths relative to samples bonded over the whole area and without air bubbles.

U.S. Pat. No. 5,516,581 and WO 95/06691 describe self-adhesive tapes which are redetachable by extension substantially in the bond plane and whose backings comprise polymeric foams. In particular, WO 95/06691 describes how, by using backing materials comprising polymer foams, it is possible to obtain self-adhesive tapes which can be redetached by stretching and which have a markedly improved conformity to rough and irregular surfaces. As a consequence of the resulting increase in bond area, these products can be used to achieve high bond strengths even on rough and irregularly shaped substrates.

Critical for the conformability of the desired self-adhesive tapes to rough and irregular surfaces and thus for the bond strength which can be achieved on corresponding substrates are primarily the mechanical properties of the self-adhesive tape in the direction of the bond plane (compressive strength, tear strength, surface characteristics, compression set, etc.) and also the thickness of the self-adhesive tape, properties which are defined essentially by the profile of properties of the foam-containing intermediate backing that is used, in just this preferential direction, and by its thickness. The mechanical properties in the direction of stretching, which substantially influence the detachment process, and those perpendicular to the bond plane, which essentially determine the conformability to rough and irregular substrates, however, cannot be controlled at will and independently of one another with the adhesive films known to date. In this context, low stripping forces in particular are desired for the detachment process, so as on the one hand to enable easy and pleasant detachment while on the other hand obtaining nondestructive detachment even from highly sensitive substrates, such as wallpapers, for example. Easy detachment is observed when the self-adhesive tapes couple high extension with a very low yield stress.

The object of the present invention was to overcome the abovementioned disadvantages and, in particular, to obtain self-adhesive tapes which:

can be redetached without residue and without destruction by stretching, especially in the bond plane, which through the use of foam-containing intermediate backings possess a high conformability to rough and irregularly shaped surfaces and thus permit high bond strengths on corresponding substrates, which are able to utilize the large number of commercially obtainable foams, and which at the same time permit targeted control of the detachment forces (stripping forces) by appropriate modification of foam-containing intermediate backings, it not being necessary for the foam-containing intermediate backings to contribute to the tear strength required for detachment, without residue and without destruction, by stretching essentially in the bond plane.

This is achieved by means of adhesive tapes as characterized in more detail in the claims, especially adhesive films which can be redetached without residue and without destruction by stretching especially in the bond plane, and which comprise foam-containing backings or intermediate backings, where corresponding foam-containing backings have been subjected to controlled modification by means of damaging/pretreatment, for example cutting, perforating or punching, as a result of which the forces required for stretching the abovementioned foam-containing backings are controllable and are lower than the stretching forces of foam-containing backings which have not been pretreated in this way, so that resulting adhesive films which utilize the abovementioned foam-containing backings exhibit reduced detachment forces and thus improved detachment behaviour.

The redetachment, without residue or destruction, of self-adhesive tapes according to the invention is achieved by a sufficiently high tear strength and elongation at break of the pressure-sensitive adhesive compositions which are utilized in combination with the abovementioned foams.

The possibility described herein of the controlled pretreatment (damaging) of foam-containing backings means that a very large selection of foams is available for this application. In this way it is possible to realize self-adhesive tapes having a broad spectrum of use on the basis of inexpensive raw materials. Through the nature of the pretreatment and the manner and layer thickness of the pressure-sensitive adhesive compositions used it is possible in particular to control, within wide ranges, the detachment forces (stripping forces) of self-adhesive tapes according to the invention. Since the force necessary for stretching the backing is an important co-determinant of the detachment forces required for deadhesion by stretching, the detachment forces for self-adhesive tapes according to the invention are much lower than those of the tapes described in U.S. Pat. No. 5,516,581 and WO 95/06691, with the use of identical pressure-sensitive adhesive compositions and amounts applied, which constitutes a considerable advantage for the user.

Foam backings described in U.S. Pat. No. 5,516,581 and WO 95/06691 must, moreover, possess throughout their lifetime the high tear strength and extensibility required for the process of detachment by stripping. If ageing results in a reduction in one of the abovementioned parameters, then the residueless detachment process is threatened. This is not the case for adhesive films according to the invention, since in this case the residueless redetachment process is determined primarily by the profile of properties of the pressure-sensitive adhesive compositions used and not by the mechanical strength of the utilized backing films in the direction in which these adhesive films can be removed by stretching.

In the case of bonding onto rough and highly sensitive substrates, such as coated woodchip wallpaper, it is found that self-adhesive tapes according to the invention allow much more uniform stressing of the bond substrates as a consequence of the relatively high bond area. The result of this is markedly fewer instances of destruction of the substrates on redetachment, for instance in the form of paint which has been torn away, and a much greater load capacity, especially with low-strength substrates, as compared with adhesive films that do not utilize intermediate foam backings.

Exemplary applications

Self-adhesive tapes which can be redetached without residue and without destruction for:

Original closure applications, single- and double-sided adhesive.

The fixing of posters, pictures, calendars, post-cards, signs, self-adhesive hooks, including those which are preassembled, labels, for example price labels, generally, for joining materials which are to be parted again at a later point in time.

Damping elements, insulating elements, sealing elements.

Materials employed

Pressure-sensitive adhesive compositions

The pressure-sensitive adhesive compositions used are preferably those based on block copolymers comprising polymer blocks formed from vinylaromatic compounds (A blocks), preferably styrene, and those formed by polymerization of 1,3-dienes (D blocks), preferably butadiene and isoprene. Both homo- and copolymer blocks can be used in accordance with the invention. Resulting block copolymers may contain identical or different D blocks, which can in part be selectively or completely hydrogenated. Block copolymers can have a linear A-D-A structure. It is also possible to employ block copolymers of radial design, and star shape and linear multiblock copolymers. Further components present can be A-D diblock copolymers. Block copolymers can be modified, for example functionalized by reaction with maleic anhydride. Block copolymers of vinylaromatic compounds and isobutylene can likewise be employed in accordance with the invention. All of the abovementioned polymers can be used alone or in a mixture with one another. Typical use concentrations for the styrene block copolymers are in the range between 15% by weight and 75% by weight, preferably in the range between 30% by weight and 60% by weight and, with particular preference, in the range between 35% by weight and 55% by weight.

Suitable tackifiers include: rosin and its derivatives, aliphatic, aromatic-modified aliphatic, aromatic and phenol-modified tackifier resins, to name but a few. The concentrations in which the resins are employed are typically in the range between 15% by weight and 75% by weight, preferably in the range between 30% by weight and 65% by weight and, with particular preference, in the range between 35% by weight and 60% by weight. In the case of the use of rosin and its derivatives it is preferred to employ esters of partially or fully hydrogenated rosin.

As endblock-compatible resins (resins compatible primarily with the vinylaromatic blocks) it is possible to use homo- and copolymers of vinylaromatic compounds, for example styrene or α-methylstyrene, polyphenylene oxides, or phenylene oxide-modified resins.

Further optimum blend components comprise plasticizer oils and liquid resins (use concentrations between 0 and max. about 35% by weight), fillers (reinforcing and nonreinforcing), e.g. silica, especially synthetic silica, glass (ground or in the form of beads), aluminas, zinc oxides, calcium carbonates, titanium dioxides, carbon blacks, to name but a few, anti-ageing agents (primary and secondary antioxidants, light stabilizers, anti-ozonants, metal deactivators, etc.). Blend components likewise comprise polymers which exert an effect, in particular, on the ozone resistance of block copolymers, for example polyvinyl acetates and ethylene-vinyl acetate copolymers.

Other copolymers which can be present are natural and synthetic polymers such as, for example, natural rubber, synthetic polyisoprenes, polybutadienes, poly-chloroprenes, SBR, Kraton liquid (Shell Chemicals), low molecular mass styrene-diene block copolymers, for example Kraton LVSI 101, polyisobutylenes, etc., which can replace up to about 50% by weight of the vinylaromatic-containing block copolymers.

Pressure-sensitive adhesive compositions used in accordance with the invention can be crosslinked chemically, especially by radiation-chemical means (for example by UV irradiation, γ irradiation or by irradiation with rapid electrons).

Adhesive compositions according to the invention are optionally those whose tackiness is brought about only by thermal activation.

In addition to the pressure-sensitive adhesive compositions described above which are based on vinylaromatic-containing block copolymers, other suitable pressure-sensitive adhesive compositions are those which have sufficient tear strength, cohesion and extension for the detachment process. Such pressure-sensitive adhesive compositions can be employed alone or in combination with those based on vinylaromatic-containing block copolymers. Examples of compounds suitable in accordance with the invention are adhesive acrylate copolymers copolymerized with macromonomers, the macromonomers having a glass transition temperature of >+40° C. The high tear strength of such copolymers is probably achieved by the association of the macromonomers. Examples of suitable macromonomers are methacryloyl-terminated polymethyl methacrylates.

Foams

Foams (foam backings) according to the invention are based, in particular, on homo- and copolymers of ethylene, especially polyethylenes of low and very low density (LDPE, LLDPE, VLDPE), ethylene-vinyl acetate copolymers, and mixtures of the abovementioned polymers. Further polymers may include: polyvinyl acetates, polypropylenes, EPDM, thermoplastic elastomers based on styrene block copolymers, polyurethanes based on aromatic and aliphatic diisocyanates, PVC, polychloroprenes, natural rubber, acrylate copolymers. Foams can be employed in crosslinked or noncrosslinked form.

The thicknesses of the foams employed are, in particular, between 175 $\mu$m and 30 mm, preferably between 250 $\mu$m and 7 mm. Densities are from 20 to 500 kg/m$^3$, preferably from 30 to 300 kg/m$^3$. The foam structure can be a closed-cell, open-cell or mixed-cell one. It is possible to use foams of integral or non-integral structure, with or without a skin. Likewise suitable for use in accordance with the invention are laminates of two or more foams.

Pretreatment of the foams

To modify the detachment forces, the foam-containing intermediate backings of self-adhesive tapes according to the invention are subjected to a pretreatment/damaging by, for example, perforation, cutting or punching. This pretreatment can be carried out before or after the first coating with pressure-sensitive adhesive composition. The results of the pretreatment are, in particular, incisions in the foam-containing backing or removals of material from the foam-containing backing, which incisions or removals reduce the mechanical strength of the backing in the direction in which, subsequently, the self-adhesive tapes produced using said backing are to be detached by stretching essentially in the bond plane.

Examples of appropriate pretreatments are: cuts, punchings and perforations. These can cover the total area of the foam-containing backings or can be present in delimited regions. They can have a regular structure or sequence or can be irregular.

A distinction can be made between pretreatments in which the original form of the foam-containing backing materials is retained and those in which, by means of removal of material (for example punching out) or thermal treatment (for example melting), regions are produced in the backing which are free from material, for instance in the form of perforation-like or channel-like openings in the backing. Incisions and regions free from material may penetrate only partway or else completely through the foam-containing backing, or mixtures of these forms can be present. They can be made on one side or both sides in the foam-containing backing.

The abovementioned regions free from material can be utilized in the manufacturing process such that in the end product they are filled with pressure-sensitive adhesive composition, with the result that, in the case of adhesive films coated double-sidedly with pressure-sensitive adhesive composition and with regions free from material which penetrate the foam backing there is a continuous connection of the two layers of pressure-sensitive adhesive. The resulting positive connection improves, inter alia, the integrity of corresponding adhesive films in the course of the detachment process.

Anchoring of the self-adhesive compositions to the foams

To produce a sufficient anchorage of the pressure-sensitive adhesive compositions that are employed to the foam-containing backings, the latter are advantageously subjected to a pressure pretreatment in the course of foam production and/or prior to coating. Suitable pretreatment processes include fluorine pretreatment, corona pretreatment, plasma treatment and flame pretreatment, the latter in particular by means of an electrically polarized flame. Pretreatment methods can be employed on their own or in combination. In the case of foams with a skin and integral foams, the foam can be primed in order to improve still further the anchorage of the adhesive composition.

Open-cell and mixed-cell foams can be subject to impregnation. Between the foam and the pressure-sensitive adhesive compositions it is possible, optionally, to integrate a barrier layer in order to reduce the passage of migratable materials between pressure-sensitive adhesive compositions and backings.

Self-adhesive tapes

Self-adhesive tapes according to the invention comprise at least one foam backing which is equipped on one or both sides with a pressure-sensitive adhesive composition. The adhesive composition is of sufficient elongation at break and tear strength to enable such self-adhesive tapes to be redetached from the bond substrates without residue and without destruction by stretching in particular in the bond plane. Pressure-sensitive adhesive compositions can be identical or different in formulation, may cover the foam over its entire area or partly, for instance in a strip, and can be applied with an identical or different amount on both sides of the adhesive tape. Adhesive compositions can be composed of one or more layers of adhesive composition. For example, an adhesive layer can consist of two strata both of which use vinylaromatic-containing block copolymers but where the block copolymers are the same or different. In addition, an adhesive layer based on other rubbers such as natural rubber or polybutadiene or polyisobutylene or "Kraton Liquid" (Shell Chemicals) or mixtures of the abovementioned polymers can be applied to a first adhesive layer comprising vinylaromatic-containing block copolymers.

Self-adhesive tapes are characterized in that their elongations at break are in particular greater than 200%, preferably greater than 350% and, with particular preference, greater than 450%.

The tear strengths of the pressure-sensitive adhesive compositions used are greater than 1.5 MPa, preferably greater than 3 MPa and, with particular preference, greater than 5 MPa.

Layer thicknesses of the pressure-sensitive adhesive compositions which determine the tear strength are in particular $\geq$ about 75 $\mu$m, preferably a 125 $\mu$m and, with particular preference, a 160 $\mu$m.

The ratio of tear strength to stripping force of the self-adhesive tapes at peel angles of <10° relative to the bond surface is greater than 1.2:1, preferably greater than 1.5:1, and, with particular preference, greater than 2:1.

Manufacturing form

Manufacturing forms of adhesive tapes according to the invention include both rolls of adhesive tape and sections of adhesive tape of defined dimensions, for example in the form of punched sections. Adhesive tape sections of defined dimensions may optionally have a shaped end in accordance with DE 4.428.587, for instance an end which comes together as a point, or may be equipped, in accordance with DE 4.431.914, with a release-coated grip-tab film or with coated release paper.

Production

Adhesive films according to the invention can be produced by solvent coating, cold- or hot-lamination and by melt coating of the foams that are to be used. The working of the foam-containing backings by, for example, perforation, cutting or punching can be carried out by means of the customary techniques known to the skilled worker, for example mechanically by means of cutting with a blade, using a rotary punch, using perforation knives, or thermally, for example by laser perforation. This working can be practised either on the foam-containing backing itself or on the material coated on one side with pressure-sensitive adhesive composition.

Test Methods

Tip shear strength

To determine the tip shear strength, the adhesive film to be tested, which measures 20 mm * 50 mm, and is provided at one end on both sides with a non tacky grip-tab region (obtained by laminating on 25 μm thick biaxially oriented polyester film measuring 20 mm * 13 mm (Hostaphan RN 25)) is bonded to the centre of a highly polished square steel plate measuring 40 mm * 40 mm * 3 mm (length * width * thickness). On its back the steel plate is provided centrally with a 10 cm long steel rod which sits vertically on the surface of the plate. The test specimens obtained are bonded to the test substrate with a force of 100N (press-on time=5 s) and are left in the unloaded state for 5 minutes. After setting the chosen tip shear load by suspending a weight (lever arm and mass of the weight are selectable), the time is measured until the bond fails.

Detachment force (stripping force)

To determine the detachment force (stripping force) an adhesive film measuring 50 mm * 20 mm (length * width) with a non-tacky grip-tab region (see above) at the top end is bonded between two steel plates (arranged so as to overlap one another precisely) measuring 50 mm ×30 mm, in accordance with the procedure described under "Tip shear strength" but with application pressures of 500N in each case. The steel plates each carry at their lower end a bore for accommodating an S-shaped steel hook. The bottom end of the steel hook carries a further steel plate, by means of which the test setup can be fixed into the lower clamping jaw of a tensile tester for measurement. The bonds are stored at +40° C. for 24 h. After reconditioning to RT, the adhesive film strip is pulled out parallel to the bond plane at a traction rate of 1000 mm/min. During this procedure the detachment force (stripping force) required is measured in N/cm. Finally, the steel plates are checked for residues of adhesive composition.

Bond area on glass

Adhesive film strips measuring 20 mm×50 mm are bonded centrally onto a planar steel substrate measuring 200 mm×100 mm. The resulting assembly is bonded vertically and with precise overlap on a glass plate of the same dimensions and is pressed on with a force of 100N applied uniformly and centrally. The pressing-on time is 5 s. The measurement is carried out in triplicate. The bond area obtained on the glass surface is determined visually and expressed as a percentage of the surface area of the adhesive film.

Bond area on woodchip wallpaper

To determine the bond area on rough substrates, adhesive film strips measuring 20 mm×50 mm are bonded centrally to a planar steel substrate measuring 200 mm×100 mm. The resulting assembly is applied vertically and with precise overlap to a coated woodchip wallpaper (wallpaper: Erfurt Körnung 52; colour: Herbol Zenit LG; wallpaper bonded to compression chipboard) of the same dimensions which has been given a thin powdering of aluminium bronze and is pressed on with a force of 100N applied uniformly and centrally. The pressing time is 5 s. The measurement is carried out in triplicate. Samples can readily be lifted vertically from the powdered woodchip wallpaper. The bond area obtained is determined visually by means of the aluminium bronze which has been transferred to the surface of the adhesive film and is expressed as a percentage of the surface area of the adhesive film.

Testing for residueless and nondestructive redetachment

A corresponding test is carried out as part of the determination of the detachment force (stripping force) (see above) for the substrates steel//steel. To test for redetachability without residue and without destruction on other substrates as well, for example PMMA//coated woodchip wallpaper (wallpaper, Erfurt Körnung 52; colour: Herbol Zenit LG; wallpaper bonded to compression chipboard) appropriate test specimens are produced, as described above under "detachment force (stripping force)", and the bond is parted (stripped) either mechanically or manually. An assessment is made of whether residues of adhesive composition are present on the bond substrates and, respectively, of whether it is possible to detect instances of destruction of the bond substrates.

EXAMPLES

Examples 1 to 7

Alveolit TA 0501.5 and Alveolit TE 05000.8 (Alveo AG) are subjected to perforation punching in the lengthwise direction of the web to produce 8 mm incisions at a crosswise distance of 2 mm which penetrate the entire foam and which are interrupted by 3 mm sections which have not been punched through. Adjacent punched incisions are offset by 5.5 mm relative to one another, so that in each case alternate punched incisions are coincident. A pressure-sensitive adhesive composition consisting of 20 parts of SBS block copolymer (Vector 8508, Exxon), 80 parts of SIS block copolymer (Vector 4211, Exxon), 100 parts of a penta ester of partially hydrogenated rosin (Foralyn 110, Hercules) and 1 part of a primary antioxidant (Irganox 1010, Ciba Geigy) [=formulation 1] is applied by cold lamination to both sides of appropriate foams. For this purpose the chosen foam is placed on the pressure-sensitive adhesive, which is on siliconized release paper, and then rolled over five times with a rubber-coated steel roller 25 cm wide with a pressure of 50N. The intermediate product obtained in this way is coated with pressure-sensitive adhesive on the second side in an identical manner. Tests are carried out after the resulting samples have been conditioned for 24 hours in a climatically controlled chamber (50% relative humidity, T=RT=23° C.). Test specimens (adhesive films) are in all cases punched out transversely to the direction of manufacture of the foam backing used. For comparison, the analogous, nonperforated foam-containing adhesive films, and adhesive films which do not contain foam, are investigated. The following properties are found:

| Example # | Sample designation | Trade name of foam | Type of foam | Manufacturer |
|---|---|---|---|---|
| 1 | 3.014 | Alveolit TA 0501.5 | PE cross-linked | Alveo AG |
| 2 | 3.014A | Alveolit TA 0501.5 | PE cross-linked | Alveo AG |
| 3 | 3.014B | Alveolit TA 0501.5 | PE cross-linked | Alveo AG |
| 4 | 3.017E | Alveolit TE 0500.8 | EVAc cross-linked | Alveo AG |
| 5 | 3.017A | Alveolot TE 0500.8 | EVAc cross-linked | Alveo AG |
| 6 | 3.000A | — | — | — |
| 7 | 3.000B | — | — | — |

| Sample designations | Foam thickness in μm | Density in kg/m$^3$ | Amount of adhesive applied Sides A//B | Adhesive formulation |
|---|---|---|---|---|
| 3.014 | 1500 | 200 | 200//200 g/m$^2$ | [1] |
| 3.014A | 1500 | 200 | 200//200 g/m$^2$ | [1] |
| 3.014B | 1500 | 200 | 200//200 g/m$^2$ | [1] |
| 3.017E | 800 | 200 | 200//200 g/m$^2$ | [1] |
| 3.017A | 800 | 200 | 200//200 g/m$^2$ | [1] |
| 3.000A | — | — | 360 g/m$^2$ | [1] |
| 3.000B | — | — | 650 g/m$^2$ | [1] |

| Sample designations | Stripping force | Bond area in % on woodchip | // on glass | Tip shear strength*** |
|---|---|---|---|---|
| 3.014 | 20–30 N/cm | about 80% | >95% | >25 days |
| 3.014A | 8.7 N/cm | about 80% | >95% | >25 days |
| 3.014B | 9.5 N/cm | about 80% | >95% | >25 days |
| 3.017E | 26 N/cm | about 80% | >95% | >25 days |
| 3.017A | 14 N/cm | about 80% | >95% | >25 days |
| 3.000A | — | about 30% | 40–50%**** | 4–6 days |
| 3.000B | — | about 40% | 60–70%**** | 8–12 days***** |

| Sample designation | Does foam tear on detachment | Can adhesive film be stripped without residue or destruction* | Is foam perforated? |
|---|---|---|---|
| 3.014 | yes | yes | no |
| 3.014A | ** | yes | yes** |
| 3.014B | ** | yes | yes** |
| 3.017 | no | yes | no |
| 3.017A | ** | yes | yes** |
| 3.000A | — | yes | — |
| 3.000B | — | yes | — |

*Bond substrates = steel//steel and coated woodchip//PMMA
**Foam peforated as described above; foam is irreversibly deformed on stretching
***Lever arm = 50 mm; shear load = 5 N; substrate = coated woodchip wallpaper
****Extensive air inclusions
*****Woodchip wallpaper splits in the bonded area The pretreatment of the foam backings which has been carried out achieves a marked reduction in the detachment forces (stripping forces) in all cases.

This does not adversely affect the residueless and nondestructive detachment behaviour. At the same time, the perforation which has been carried out does not affect the bond area which can be achieved nor the bond strengths which can be achieved. In all cases, in comparison with the adhesive films which do not utilize foam intermediate backings, substantially higher bond areas and bond strengths are found.

What is claimed is:

1. Adhesive tape for a bond which can be detached by pulling, without residue and without damage, having a foam backing coated on one or both sides with a self-adhesive composition, comprising a) a foamed backing having applied thereto on at least one of the two sides of the foam backing a self-adhesive composition whose ratio of tear strength to stripping force (peel force) at a peel angle of less than 10 to the bond surface is greater than 1.2:1, b) the foam backing being subjected to controlled pretreatment/damaging by incision in such a way that the mechanical strength of the backing is reduced when the self-adhesive tape subsequently produced using the damaged backing is stretched in the direction of the bond in the course of detaching the tape by pulling, the detachment force (stripping force) is lowered relative to an analogous self-adhesive tape with a foam backing which has not been correspondingly pretreated/damaged, c) the foam backing not having a tear strength which is sufficient for detachment without residue or damage.

2. Adhesive tape according to claim 1, wherein the foam backing is coated on both sides with self-adhesive composition.

3. Adhesive tape according to claim 1, wherein the self-adhesive composition is based on block copolymers.

4. Adhesive tape according to claim 3, wherein the self-adhesive composition is based on block copolymers of vinylaromatic compounds.

5. Adhesive tape according to claim 1, wherein the self-adhesive composition is based on block copolymers comprising polymer blocks of vinylaromatic compounds (A blocks) and those formed by polymerization of 1,3-dienes (D blocks).

6. Adhesive tape according to claim 1, wherein the self-adhesive composition comprises tackifiers and, optionally further blend components and/or additives.

7. Adhesive tape according to claim 1, wherein the pretreatment/damaging of the foam backing is carried out by means of full cuts, partial cuts, perforation or punching.

8. Adhesive tape according to claim 7, wherein the pretreatment covers the total area of the backing or a limited portion of the backing.

9. Adhesive tape according to claim 7, wherein the pretreatment can be a regular structure or sequence or can be irregular.

10. Adhesive tape according to claim 1, wherein the damage sites penetrate partway or completely through the foam backing.

11. Adhesive tape according to claim 1, wherein the tape is in the form of sections, where one end of a section has a non-tacky grip tab and the other end, optionally, has an adhesive area which decreases towards the end.

12. Adhesive tape according to claim 11, wherein the grip tab is formed by laminated-on film sections whose sides in contact with the self-adhesive composition have been given an anti-adhesive finish.

13. Adhesive tape according to claim 1, wherein the self-adhesive does not penetrate the damaged foam backing such that the mechanical strength of the damaged foam backing is not reduced.

14. Method for detaching a bonded section of an adhesive tape according to claim 1, without residue and without damage, comprising pulling one end of the section in the bond plane until the bond is detached.

15. Method according to claim 14, wherein the section is coated on both sides with self-adhesive composition and is used together with a hook, a base plate or an article which is to be suspended, and, optional, is preassembled on such articles.

16. Adhesive tape for a bond which can be detached by pulling, without residue and without damage, having a foam backing coated on one or both sides with a self-adhesive compositions, comprising a) a foamed backing having applied thereto on at least one of the two sides of the foam backing a self-adhesive composition whose ratio of tear strength to stripping force (peel force) at a peel angle of less than 10 degrees to the bond surface is greater than 1.2:1, b) the foam backing being subjected to controlled pretreatment/damaging by means of incisions, full cuts, partial cuts, perforation or punching in such a way that the mechanical strength of the foam backing is reduced when the self-adhesive tape subsequently produced using the damaged backing is stretched in the direction of the bond in the course of detaching the tape by pulling, the detachment force (stripping force) being lowered relative to an analogous self-adhesive tape with a foam backing which has not been correspondingly pretreated/damaged, c) the foam backing not having a tear strength which is sufficient for detachment without residue or damage.

17. Adhesive tape according to claim 1, wherein the foam backing is coated prior to pretreatment/damaging, the damaging including removing material from the self-adhesive coated foam backing, such that the self-adhesive does not penetrate the damaged foam backing such that the mechanical strength of the damaged foam backing is not reduced.

* * * * *

UNITED STATES PATENT AND TRADEMARK OFFICE
CERTIFICATE OF CORRECTION

PATENT NO. : 5,897,949
DATED : April 27, 1999
INVENTOR(S) : Luhmann, et al.

It is certified that error appears in the above-identified patent and that said Letters Patent is hereby corrected as shown below:

Col. 10, line 6   After " 10 " insert -- degrees --

Signed and Sealed this

Nineteenth Day of October, 1999

Attest:

Q. TODD DICKINSON

*Attesting Officer*            *Acting Commissioner of Patents and Trademarks*